(12) United States Patent
Receveur et al.

(10) Patent No.: US 9,009,891 B2
(45) Date of Patent: Apr. 21, 2015

(54) AUTOMATIC PATIENT WEIGHT MEASUREMENT FOR DETERMINING PRESSURE RELIEF SET POINTS

(75) Inventors: Timothy J. Receveur, Guilford, IN (US); Charles A. Lachenbruch, Lakeway, TX (US)

(73) Assignee: Hill-Rom Services, Inc., Batesville, IN (US)

( * ) Notice: Subject to any disclaimer, the term of this patent is extended or adjusted under 35 U.S.C. 154(b) by 578 days.

(21) Appl. No.: 13/242,048

(22) Filed: Sep. 23, 2011

(65) Prior Publication Data

US 2013/0074262 A1 Mar. 28, 2013

(51) Int. Cl.
| | |
|---|---|
| *A61G 13/00* | (2006.01) |
| *G01G 19/44* | (2006.01) |
| *G01G 5/00* | (2006.01) |
| *G01G 5/04* | (2006.01) |
| *A61G 1/00* | (2006.01) |
| *A61G 5/00* | (2006.01) |
| *A61G 7/015* | (2006.01) |
| *A61G 7/057* | (2006.01) |
| *A61G 7/05* | (2006.01) |

(52) U.S. Cl.
CPC .......... *G01G 19/445* (2013.01); *A61G 7/05769* (2013.01); *G01G 5/006* (2013.01); *G01G 5/04* (2013.01); *A61G 2007/0527* (2013.01); *A61G 1/00* (2013.01); *A61G 5/00* (2013.01); *A61G 7/015* (2013.01); *A61G 2007/05792* (2013.01); *A61G 2203/46* (2013.01)

(58) Field of Classification Search
USPC ........ 5/713, 914, 630, 632, 652, 710, 81.1 R, 5/732, 631, 637, 644, 628, 425; 177/144
See application file for complete search history.

(56) References Cited

U.S. PATENT DOCUMENTS

| | | | |
|---|---|---|---|
| 5,279,010 A | | 1/1994 | Ferrand et al. |
| 5,957,491 A | | 9/1999 | Cech et al. |
| 5,963,997 A | | 10/1999 | Hagopian |
| 6,065,166 A | * | 5/2000 | Sharrock et al. .................. 5/630 |
| 6,094,762 A | | 8/2000 | Viard et al. |
| 7,459,645 B2 | | 12/2008 | Skinner et al. |
| 2007/0272450 A1 | | 11/2007 | Skinner et al. |
| 2011/0302720 A1 | * | 12/2011 | Yakam et al. .................. 177/144 |
| 2012/0038484 A1 | * | 2/2012 | Dixon et al. ...................... 177/1 |

FOREIGN PATENT DOCUMENTS

GB 2453371 A 4/2009

OTHER PUBLICATIONS

Outpatient Surgery Magazine; Nov. 2009; Biologics, Inc., 33 North Garden Avenue, Clearwater, FL 33755.
EP Search Report, Place of Search—The Hague, Completion of the Search—Dec. 21, 2012.

* cited by examiner

*Primary Examiner* — Peter M Cuomo
*Assistant Examiner* — Brittany Wilson
(74) *Attorney, Agent, or Firm* — Barnes & Thornburg LLP

(57) ABSTRACT

A method and a system have been described to determine a pressure relief set point for a person-support apparatus. The method includes determining the change in pressure or volume in a zone from a vacant mode to a person occupied mode and computing the weight supported there from.

14 Claims, 4 Drawing Sheets

AUTOMATIC PATIENT WEIGHT MEASUREMENT FOR DETERMINING PRESSURE RELIEF SET POINTS

BACKGROUND OF THE DISCLOSURE

A number of commercially available person-support apparatus include an air filled person support surface. Normally, the air within the person support surface can be regulated depending on the patient's requirement. It is preferable that the air pressure inside the person support surface be maintained such that the contact area between the patient and the person support surface is therapeutically optimal to minimize peak interface pressures. Air pressure should also be sufficient so that the weight of patient preferably does not cause the patient to touch the firm, structural bottom of the person support surface. An optimum value of pressure within the person support surface is called as the pressure relief set point. Pressure relief set point values can vary from patient to patient depending, for instance, on their weight as well as potentially other variables. While various systems and methods have been developed to accommodate patients of various weights on a person support surface in an optimal manner, there is still room for improvement. Thus a need persists for further contributions in this area of technology.

SUMMARY OF THE DISCLOSURE

The present disclosure includes one or more of the features recited in the appended claims and/or the following features which, alone or in any combination, may comprise patentable subject matter.

One illustrative embodiment of the present disclosure includes a method and a system to determine the weight of a person supported on a person-support apparatus. The method includes the step of maintaining a predetermined pressure in at least one zone of the person support surface in a vacant mode. The next step includes measuring the pressure in at least one zone in a patient occupied mode. The next step includes calculating the volume of the medium in patient occupied mode based on pressure and volume in vacant mode and pressure in patient occupied mode in at least one zone. The next step includes determining the volume difference in a vacant mode and a patient occupied mode in at least one zone of the person support surface. The next step includes determining the air density in at least one zone using the pressure determined in patient occupied mode calculated for at least one zone. A further step includes determining the weight of the person using the density of the medium in the patient occupied mode and the volume difference from the at least one zone. A further step includes determining the pressure relief set point as a function of the weight of the person.

Additional features alone or in combination with any other feature(s), including those listed above and those listed in the claims and those described in detail below, can comprise patentable subject matter. Others will become apparent to those skilled in the art upon consideration of the following detailed description of illustrative embodiments exemplifying the best mode of carrying out the invention as presently perceived.

BRIEF DESCRIPTION OF THE DRAWINGS

Referring now to the illustrative examples in the drawings, wherein like numerals represent the same or similar elements throughout.

DETAILED DESCRIPTION OF THE DRAWINGS

Figure 1:
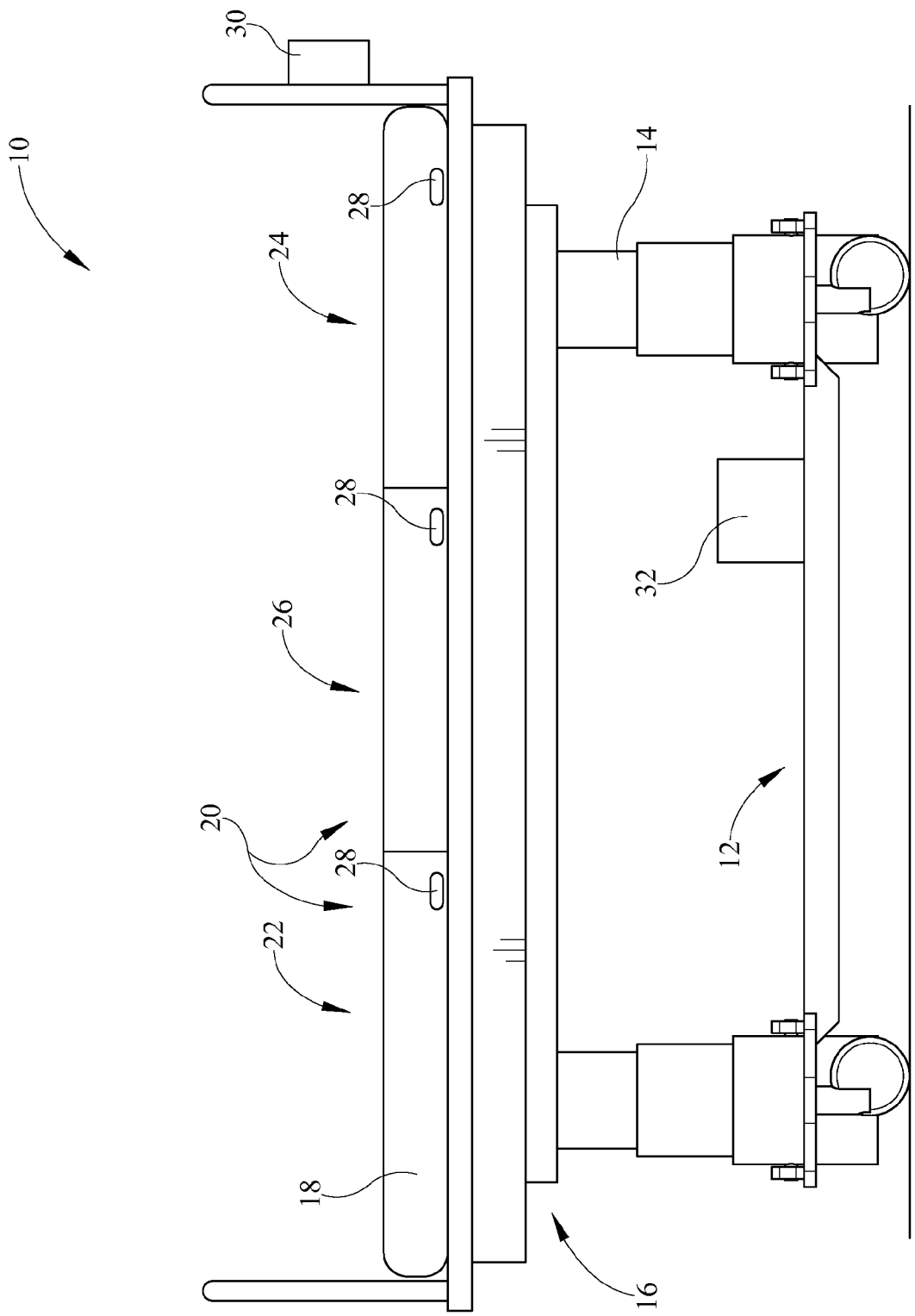
FIG. 1 is a perspective side view of a person-support apparatus in the vacant mode.

While the present disclosure can take many different forms, for the purpose of promoting an understanding of the principles of the disclosure, reference will now be made to the embodiments illustrated in the drawings, and specific language will be used to describe the same. No limitation of the scope of the disclosure is thereby intended. Various alterations, further modifications of the described embodiments, and any further applications of the principles of the disclosure, as described herein, are contemplated.

One illustrative embodiment of the present disclosure can include a method and a system to determine the weight of a person supported on a person-support apparatus.

A person-support apparatus 10 according to one illustrative embodiment of the disclosure is shown in FIG. 1. The person-support apparatus 10 in one embodiment would be a hospital bed. In another embodiment, the person-support apparatus 10 could be a stretcher, a wheelchair or any other type of person-support apparatus. In one embodiment, the person-support apparatus 10 includes a lower frame 12 or base 12, at least one support 14 coupled with the lower frame 12, and an upper frame 16 supported on the supports 14 above the lower frame 12.

The person-support apparatus 10 supports a person support surface 18 on the upper frame 16. The person-support surface 18 is configured to support a person P1 in multiple articulated positions. The person-support surface 18 includes at least one zone 20 capable of containing a medium such as air. In one embodiment the at least one zone 20 also include foam. In another embodiment, the at least one zone delivers therapy to the person through expansion/or contraction and changes in pressure of the medium contained in the at least one zone. In one embodiment, one or more zones of person support surface 18 provide alternating pressure therapy, continuous lateral rotation therapy, low air loss therapy, boost assistance, percussion/vibration therapy, or turn assistance. According to an illustrative embodiment of the disclosure shown in FIG. 1 & FIG. 2, the person support surface includes a head zone 22 configured to support the head of the person P1, a foot zone 24 configured to support the feet of the person P1 and a seat zone 26 configured to support the gluteal region of person P1.

The person-support apparatus 10 includes a system configured to measure the weight of the person P1 supported on the person-support apparatus 10. The measured weight in turn can be used to calculate pressure relief set points for the at least one zone 20 for the particular person. Pressure relief set points are an optimum pressure which the caregiver needs to maintain within the at least one zone 20. The pressure relief set points can be set inside the at least one zone 20 in such a way that the contact area between the person P1 and the person support surface 18 is optimum.

Figure 2:
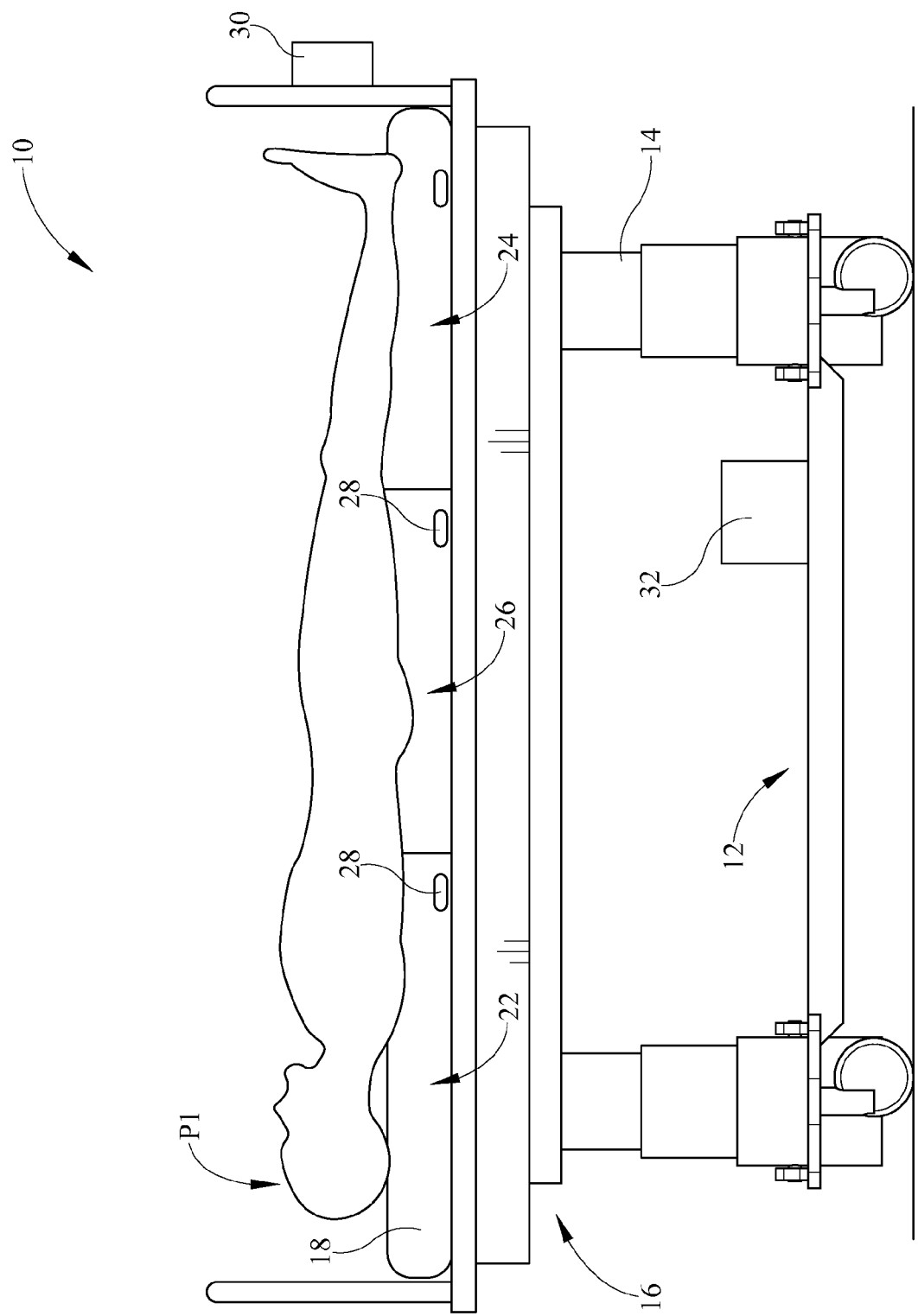
FIG. 2 is a perspective side view of the person-support apparatus along with a person in a person occupied mode.

The system includes at least one pressure sensor 28 and a controller 30 coupled with the at least one pressure sensor 28 as shown in FIG. 1 and FIG. 2. The at least one pressure sensor 28 is configured to sense the pressure within the at least one zone 20 and send the sensed value to the controller 30. The person-support apparatus 10 further includes a fluid supply unit 32 configured to supply fluid to the at least one zone 20. The operation of the fluid supply unit 32 can be controlled by the controller 30 depending upon the pressure within the at least one zone 20. The controller 30 can be any device configured to receive at least one input signal and in one embodiment have the capability to provide at least one output signal. Several types of controllers are well known in the art, including but not limited to programmable or preprogrammed types.

In one embodiment, the system to determine weight of the patient includes at least two modes, with an additional mode to set pressure in the at least one zone in accordance to a pressure relief set point based on the calculated weight of the person obtained from the first two modes. In the first mode as shown in FIG. 1, the person P1 is not supported on the person-support apparatus 10 or the person P1 has fully exited from the person-support apparatus 10. Therefore, this mode is referred to as the vacant mode. It should be appreciated that the use of any pre existing feature, such as motion sensors in the person-support apparatus 10, or placed in the room, to detect the presence of the person P1 on the person-support apparatus 10 is well within the scope of this disclosure. In one embodiment the person support surface 18 includes a head zone 22, the foot zone 24 and the seat zone 26 which are maintained at predetermined pressures $P_{H1}$, $P_{F1}$, and $P_{S1}$ respectively in the vacant mode. In one embodiment the vacant mode pressures are maintained high enough such that a person weighing a pre-determined percentile weight of the population will not bottom out the person support surface 18 up on entering the person-support apparatus 10. In another embodiment, the person support surface 18 comprises one zone. In yet another embodiment, the person support surface may include a multitude of zones.

In the second mode, the person P1 has just entered the person-support apparatus 10 as shown in FIG. 2 and this mode is referred to as a person occupied mode. In one embodiment this mode is timed to last ten seconds from the time the person P1 enters the person-support apparatus 10. In one embodiment, determination that a person is being supported by the person support surface may be made by means of patient switches (not shown) present on the person support surface 18. In another embodiment, the determination that a person is being supported by the person-support surface 18 may be made from the variation in pressure readings obtained from the at least one pressure sensor 28. The entering of the person P1 on the person-support apparatus 10 will result in the increase of pressure within the at least one zone 20. In one embodiment, pressure is recorded by the at least one pressure sensor 28 for the head zone 22, the foot zone 24 and the seat zone 26 as $P_{H2}$, $P_{F2}$, and $P_{S2}$ respectively in the person occupied mode. Pressure recorded in the person-occupied mode and in the vacant mode is used to determine the weight of the person being supported by the person support surface 18.

In a third optional mode, pressure within the at least one zone 20 is adjusted so as to maintain a pressure relief set point in the person support surface 18, accordingly the third optional mode is referred to as pressure relief mode. In one embodiment, the optimal value of pressure is a discrete value. In another embodiment, the optimal value of pressure, pressure relief set point, may be specified as a range of acceptable pressure values. In the third mode, the controller 30 is configured to control the operation of the fluid supply unit 32 to maintain the pressure within the head zone 22, the foot zone 24 and the seat zone 26 at pressure relief set points in one embodiment. In another embodiment, there may be one or a multitude of zones, and the controller 30 is configured to control the operation of the fluid supply unit 32 to maintain the pressures within each zone at pressure relief set points. In yet another embodiment, the pressure relief set point is specified as a range of pressure, and the controller 30 is configured to control the operation of the fluid supply unit 32 to maintain the pressure within at least one zone 20 within the specified range of pressure.

Figure 3:
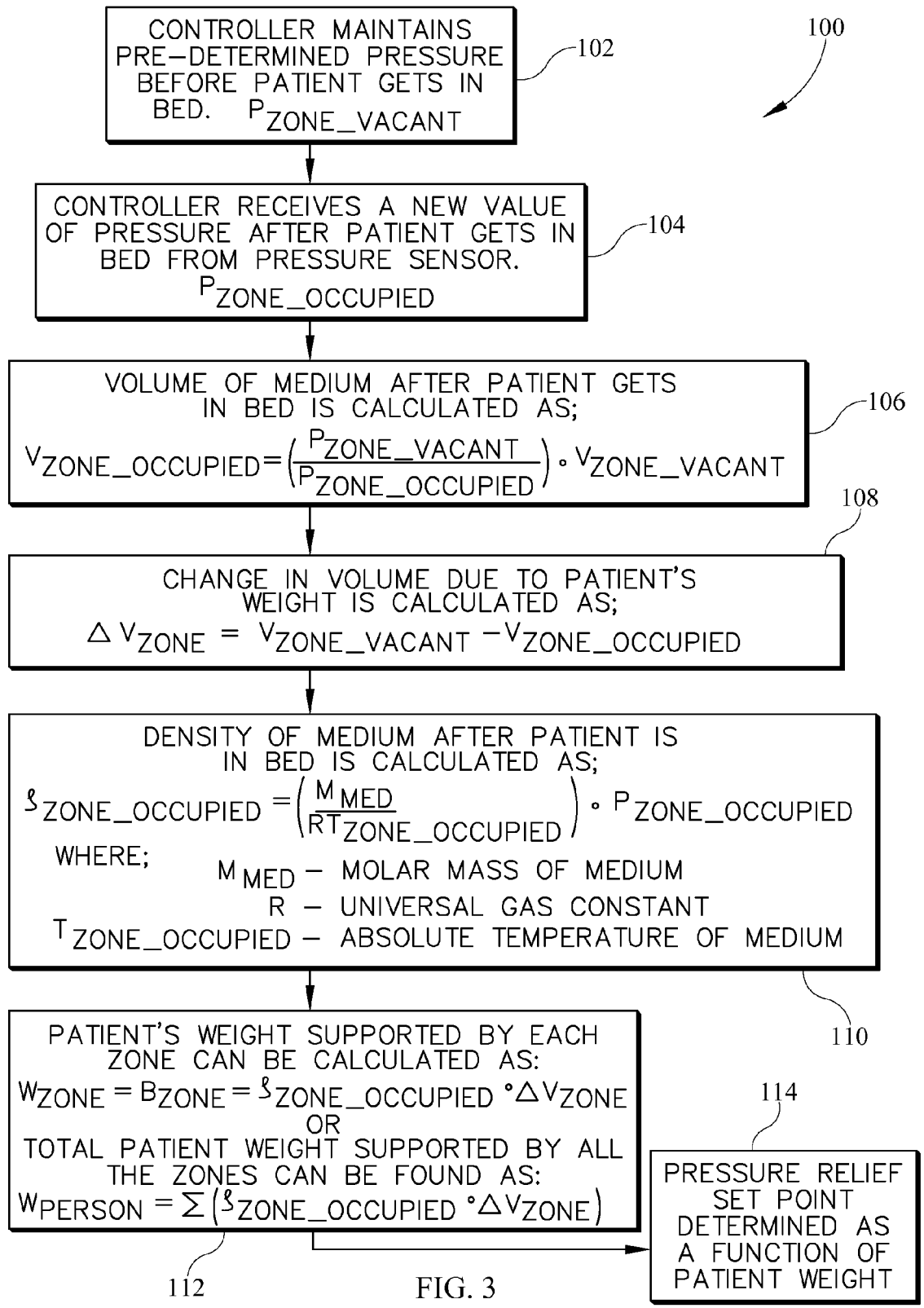
FIG. 3 is a flow chart of the method used for the determination of pressure relief set points according to an embodiment of the disclosure.

In operation, the system is configured to determine the weight of the person P1 supported by the person-support apparatus 10 as shown in flowchart 100 of FIG. 3. At step 102 the pressure within the at least one zone 20 i.e. the head zone 22, the foot zone 24 and the seat zone 26 can be maintained at $P_{H\_vacant}$, $P_{F\_vacant}$, and $P_{S\_vacant}$ respectively in the vacant mode. Upon a person P1 entering the person-support apparatus 10, pressure within the at least one zone 20 of the person support surface 18 changes. At step 104, the at least one pressure sensor 28 senses the second pressure in the person occupied mode and communicates this value to the controller 30. In one embodiment, pressures $P_{H\_occupied}$, $P_{F\_occupied}$, and $P_{S\_occupied}$ in the head zone 22, the foot zone 24 and the seat zone 26 respectively are recorded. The controller 30 may in one embodiment determine the difference between the first pressure and the second pressure i.e. $\Delta P_H$, $\Delta P_F$ and $\Delta P_S$ as follows:

$$\Delta P_H = P_{H\_occupied} - P_{H\_vacant} \qquad (1)$$

$$\Delta P_F = P_{F\_occupied} - P_{F\_vacant} \qquad (2)$$

$$\Delta P_S = P_{S\_occupied} - P_{S\_vacant} \qquad (3)$$

In step 106, the controller 30 determines the volume of the medium, in the at least one zone 20 in the person occupied mode as follows:

$$V_{occupied} = (P_{vacant}/P_{occupied}) \cdot V_{vacant} \qquad (4)$$

Where, $P_{vacant}$ is the pressure in the at least one zone 20 in vacant mode;

$V_{vacant}$ is the volume of medium in the at least one zone 20 which is found from the amount of fluid initially inserted in the at least one zone 20;

$P_{occupied}$ is the pressure in at least one zone in the person occupied mode; and $V_{occupied}$ is the volume of the at least one zone in the person occupied mode.

In equation (4) pressure $P_{vacant}$ and volume $V_{vacant}$ are known for the at least one zone 20. Therefore the controller 30 can calculate volume $V_{occupied}$ for the at least one zone 20. In equation (4), isothermal condition may be assumed and pressure $P_{vacant}$ and volume $V_{vacant}$ are not expected to change from the time the medium was inserted in the at least one zone. In another embodiment, pressure at the time of insertion of the fluid $P_{initial}$, along with the volume $V_{initial}$ of medium inserted at a particular temperature $T_{initial}$ is recorded. Volume $V_{vacant}$ in the vacant mode can be found as:

$$V_{vacant} = (P_{initial} \cdot V_{initial}/T_{initial}) \cdot (T_{vacant}/P_{vacant})$$

Where, $T_{vacant}$ is the temperature of the medium in the vacant mode which may be obtained using a temperature sensor.

At step 108, difference in volume is calculated between volume $V_{vacant}$ in the vacant mode and volume $V_{occupied}$ in the person occupied mode in the at least one zone 20. In one embodiment, the difference in volume is calculated for the head zone 22, the foot zone 24 and the seat zone 26 as $\Delta V_H$, $\Delta V_F$ and $\Delta V_S$ respectively.

At step 110, the controller 30 calculates an air density $\rho_{zone}$ inside the at least one zone 20 for the person occupied mode using following equation:

$$\rho_{zone} = (M_{med}/R \cdot T_{occupied}) * P_{occupied} \qquad (5)$$

Where: $M_{med}$ is the molar mass of the medium in the at least one zone;

R is the universal gas constant; and $T_{occupied}$ is the ambient absolute temperature in the person occupied mode; since the time lag between vacant and patient occupied mode measurements is expected to be relatively small, temperature in the vacant mode can be used alternatively in equation (5) instead of that in the occupied mode. The difference in the two temperatures (vacant mode and patient occupied mode) is expected to be miniscule and is neglected in this embodiment.

At step 112, the controller calculates the weight of the person P1 being supported by individual zones using equation (6) below. Equation (7) alternatively provides the total weight of the person P1 supported by all the zones, found by summing the weight of the person supported by each zone.

$$W_{ZONE} = B_{ZONE} = \rho_{zone} * \Delta V_{ZONE} \quad (6)$$

$$W_{Person} = \Sigma(\rho_{zone} * \Delta V_{ZONE}) \quad (7)$$

Where, $\Delta V_{ZONE}$ can be $\Delta V_H$, $\Delta V_F$ or $\Delta V_S$ for the head zone 22, the foot zone 24 and the seat zone 26 respectively in one embodiment.

Figure 4:
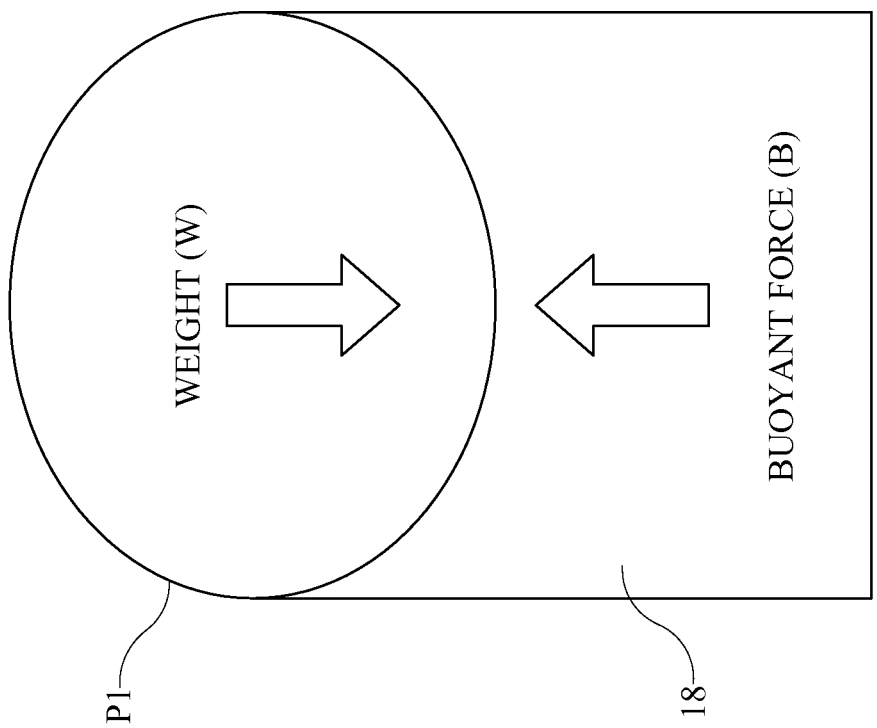
FIG. 4 is a force diagram showing buoyancy and weight equilibrium according to an embodiment of the disclosure.

As the person P1 settles on the person support surface 18, the buoyant forces $B_{ZONE}$ between the air in the person support surface 18 and the person's weight $W_{ZONE}$ balance to attain equilibrium as shown in FIG. 4.

In an optional step 114 the controller 30 determines the pressure relief set points for the at least one zone 20 for a particular person P1. The pressure relief set points can be changed from person to person depending upon the weight of the person supported on the person-support apparatus 10. The pressure relief set point may be defined as a function of the weight of the person. In one embodiment, the buoyant forces or weight borne by each zone are compared to values from a pre-determined look-up table for optimal pressure relief set point and each zone is set to corresponding pressure relief set points. In yet another embodiment, a pressure relief set point is defined as a function of the total weight of the person, or summation of weight borne by all the individual zones determined in the first two modes and all the zones are set to this singular pressure relief set point value. In another embodiment medical records obtained from electronic medical records (EMR) may be used to obtain optimal relationship between patient weight and pressure relief set point or for verifying calculated patient weight. Several factors may be taken into account when determining the relationship between weight borne by each zone and the ideal pressure relief set point, including but not limited to body type, whether or not patient is an amputee, medical conditions such as elephantiasis, hydrocephalous or any other medical condition.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless can not be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles can have been presented, they need not be utilized in combination, and various combinations of inventive aspects and principles are possible in light of the various embodiments provided above.

What is claimed is:

1. A method of determining the weight of patient supported by a person support surface, the method comprising:
   maintaining a predetermined pressure in at least one inflatable zone in said person support surface while said patient is not supported by said person support surface in a first mode;
   recording a second value of pressure in said at least one inflatable zone in said person support surface after said patient exerts weight on and is supported by said person support surface in a second mode;
   determining a volume of a medium in said at least one inflatable zone of said person support surface in said second mode using said predetermined pressure in said first mode, said second value of pressure in said second mode and said volume of the medium in said first mode;
   determining a volume difference between said volume of said medium in said first mode and said volume of said medium in said second mode;
   determining a density of said medium in said inflatable zone in said second mode using at least said second value of pressure and a molar mass of said medium; and
   approximating a weight of the person using said density of said medium in said second mode and said volume difference.

2. The method of claim 1, wherein said person support surface includes at least one pressure sensor in said at least one inflatable zone to measure said second value of pressure.

3. The method of claim 2, wherein said second value of pressure, said volume difference and said density of said medium are calculated for at least two zones.

4. The method of claim 3, further comprising determining individual pressure relief set points for each said zone by comparing approximated weight borne by each said zone with a pre-determined relationship with optimal pressure relief set point values.

5. The method of claim 3, wherein said weight of the person is determined by summing components of weight of the person supported by each of said at least two zones, said components of weight of the person for each of said at least two zones are calculated based on said density of said medium in said second mode and said volume difference in each of said at least two zones between said first mode and said second mode.

6. The method of claim 5, further comprising determining a pressure relief set point based on comparing the summed components of the person's weight supported by said zones with a pre-determined relationship with optimal pressure relief set point values.

7. A person-support apparatus comprising:

a frame;

a person support surface mounted over at least a portion of said frame, said person support surface comprising at least one pressurized zone;

at least one pressure sensor configured to sense a pressure of a medium in said at least one pressurized zone, said pressure sensor mounted to said person support surface;

a controller configured to calculate the weight of a person supported by said at least one pressurized zone of said person support surface based on a determination of a density of said medium in said at least one pressurized zone using said input received by said at least one pressure sensor and a molar mass of said medium.

8. The person-support apparatus of claim 7, further comprising a fluid supply unit, said controller being configured to control said fluid supply unit to vary the pressure of said medium in said at least one zone.

9. The person-support apparatus of claim 8, wherein said controller is configured to determine at least one pressure relief set point based on said calculated weight of the person.

10. The person-support apparatus of claim 9, wherein said controller is configured to control said fluid supply unit to maintain the pressure in said at least one zone at said pressure relief set point.

11. A person-support apparatus comprising:

a person support surface;

at least one pressure sensor configured to sense a pressure in at least one pressurized zone of said person support surface; and a controller configured to calculate a weight of a person supported by the at least one pressurized zone of said person support surface based on a determination of a density of a medium in said at least one pressurized zone using said input received by said at least one pressure sensor and a molar mass of said medium.

12. The person-support apparatus of claim 11, further comprising a fluid supply unit, said controller being configured to control said fluid supply unit to vary the pressure of said medium in said at least one pressurized zone.

13. The person-support apparatus of claim 12, wherein said controller is configured to determine at least one pressure relief set point based on said calculated weight of the person.

14. The person-support apparatus of claim 13, wherein said controller is configured to control said fluid supply unit to maintain the pressure in said at least one pressurized zone at said pressure relief set point.

* * * * *